United States Patent [19]

Sollinger et al.

[11] Patent Number: 5,189,492
[45] Date of Patent: Feb. 23, 1993

[54] DEVICE FOR MEASURING THE DEFLECTION OF ELONGATE COMPONENTS

[75] Inventors: Hans-Peter Sollinger, Heidenheim; Johannes Hennig, Herbrechtingen-Bolheim, both of Fed. Rep. of Germany

[73] Assignee: J.M. Voith GmbH, Heidenheim, Fed. Rep. of Germany

[21] Appl. No.: 825,837

[22] Filed: Jan. 27, 1992

Related U.S. Application Data

[63] Continuation of Ser. No. 385,202, Jul. 25, 1989, abandoned.

[30] Foreign Application Priority Data

Jul. 27, 1988 [DE] Fed. Rep. of Germany ....... 3825415

[51] Int. Cl.$^5$ .................................. G01B 11/14
[52] U.S. Cl. ...................................... 356/373; 356/400
[58] Field of Search ................. 356/400, 373, 152; 73/800, 849; 250/231.1, 560

[56] References Cited

U.S. PATENT DOCUMENTS

| | | | |
|---|---|---|---|
| 3,877,788 | 4/1975 | Sprague et al. | 356/124 |
| 4,730,928 | 3/1988 | Gabriel et al. | 356/373 |

Primary Examiner—F. L. Evans
Assistant Examiner—K. P. Hantis
Attorney, Agent, or Firm—Baker & Daniels

[57] ABSTRACT

The invention concerns a device for determining the distortions of elongate components with a longitudinal axis. The invention is characterized by a transmitter of electromagnetic radiation including light waves, which at least in an axially parallel plane approximately in the center (at one-half of its length) of the component is attached to its outside or firmly connected with it, and through pickups for the electromagnetic radiation, including light waves, that are arranged in the same axial line with these, outside on the ends of the component, the sensor surface of which pickups, sensitive to the radiation, features sensor elements which are distributed in the way of a faceted eye.

13 Claims, 1 Drawing Sheet

DEVICE FOR MEASURING THE DEFLECTION OF ELONGATE COMPONENTS

This is a continuation of application Ser. No. 07/385,202, filed Jul. 25, 1989, now abandoned.

BACKGROUND OF THE INVENTION

The invention concerns a device for measuring the deflection of elongate components, specifically of a beam supported on both ends, such as a support beam for the scraper blade of a paper coater or for the upper lip of a paper machine headbox.

Elongate components in various machine construction areas, specifically support beams which are preferably formed of metal, often are subject to stress by static forces, but also are subject to stresses by thermal forces due to temperature differences. The latter often lead to heavy distortions of elongate components.

The problem underlying the invention is to determine the extent of these distortions or deflections. This problem is inventionally solved by the features of the present invention in a device of the type initially cited above.

SUMMARY OF THE INVENTION

A device for measuring the deflection of an elongate component with a longitudinal axis, specifically a beam supported on both ends, includes a transmitting unit which is firmly connected with the outside of the elongate component in approximately the center thereof, which transmitting unit emits sharply focused electromagnetic radiation. A receiving unit responsive to electromagnetic radiation is arranged in axial alignment with the transmitting unit outside on the ends of the elongate component, and has a sensor surface sensitive to the radiation and including at least one row of sensor elements which are distributed in the manner of a faceted eye, with the row extending in the direction of the deflection.

BRIEF DESCRIPTION OF THE DRAWINGS

The invention will be explained hereafter with the aid of the embodiment illustrated in the drawings.

DESCRIPTION OF THE PREFERRED EMBODIMENT

Figure 1:
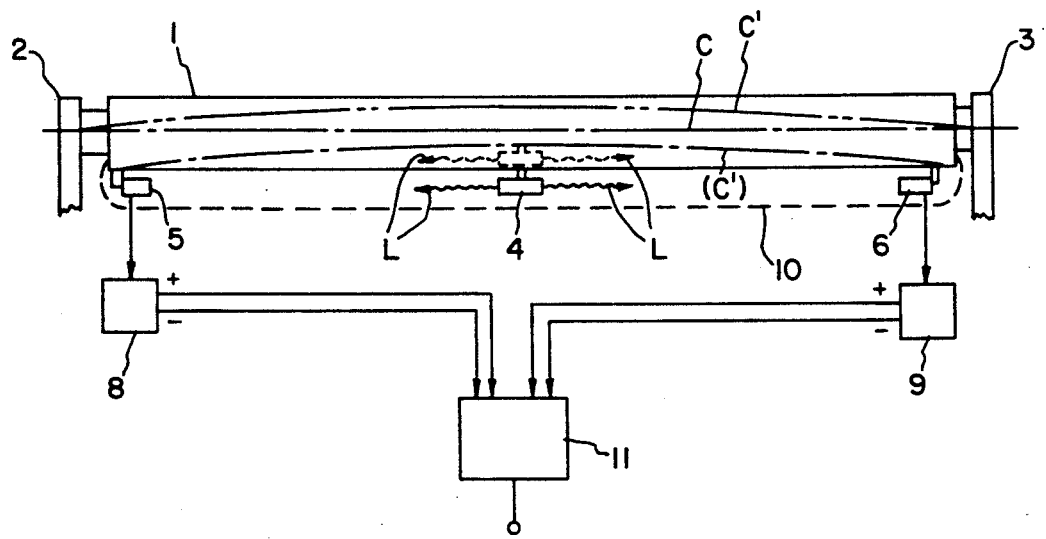
FIG. 1 is an elevational view of an elongate incorporating an embodiment of the present invention.
Figure 2:
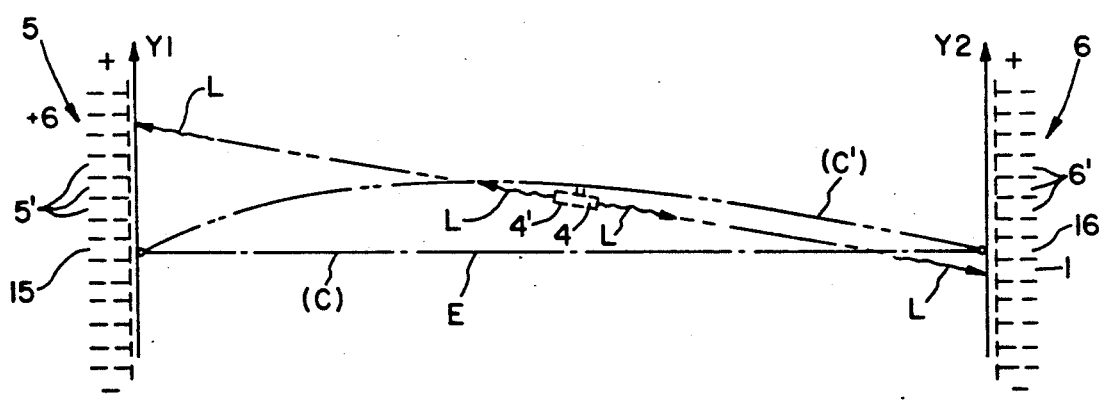
FIG. 2 is diagrammatic sketch showing the conditions of deflection of the elongate component of FIG. 1.

Referring to FIGS. 1 and 2, the beam 1 sketched as an elongate component rests on lateral supports 2 and 3. As indicated, its straight axis C, indicated by the dash-dot line, is deflected by mechanical defects so as to form the axis C' indicated by the dash-double dot line. Installed on the beam through the intermediary of brackets, in its center, i.e., at one-half of its length, is a transmitting unit 4 for electromagnetic radiation or light, including laser light, and on the two ends of the beam, receiving units (pickup 5 and 6) for the electromagnetic radiation or light. The electromagnetic radiation or light is indicated by the arrows marked L. The pickups have a sensor surface on which sensor elements 5' or 6' are distributed in the way of a faceted eye. These are able to determine the degree of center axis distortion according to the distorted center axis C', on the basis of the inclination of the rays L that exists then relative to the undistorted center axis C. There may as well be provided only a single row of sensor elements, as can be seen from FIG. 2, if the plane of deflection is clearly known to begin with.

The respective "zero sensor", which is located in the origin of the x-y coordinate cross, i.e., in the zero point of the y-axis, is marked 15 and 16, respectively. The scale in the direction of the y-axis is considerably enlarged here relative to the length, along the "zero sensor plane" E. The greater the distance of the sensor element 5' or 6' from the zero sensor 15, 16, the stronger the deflection signal that is emitted by the sensor element 5', 6'.

The measured values of the various receivers arranged on the two ends of the elongate component or beam are preferably added and the result is divided by two. In this way, a good measure for the actual deflection is obtained also in the case of an asymmetric deflection, according to FIG. 2. Employed to that end is a summing device 11, which may be designed also as an averaging device. Here, the signal Y 1 = +6, the signal Y 2 = −1, thus, one-half the sum is 2.5.

Thermal stresses can preferably be precluded by providing the beam with cooling channels or heating channels, which are provided within it or on its outside. A slight localized distortion of the beam in the center area, however, where the receiver(s) are preferably applied, is compensated for in the measuring result by the proposed arrangement. Resulting from such distortions (plate distortion) of the beam is a slanted arrangement of the transmitter which, however, essentially leads to equally large measuring results of opposite sign, of a faked beam deflection, which offset one another through the summation.

Suitable as sensor elements of the pickups 5 and 6 are preferably light-sensitive diodes and it is recommended that the transmitter 4, respectively 4', operate with laser light.

For the "simple" case of a symmetric deflection according to FIG. 1, one transmitting unit (for instance the right-hand unit 4 in FIG. 2) is frequently sufficient, and consequently also only one receiver unit (unit 6 in FIG. 1 or, alternatively, also transmitting unit 4' of FIG. 2 and receiving unit 5 in FIG. 1).

For a trouble free operation, naturally, it is favorable to arrange the signal devices within a sheet metal cover 10 attached to the elongate component or beam 1. The one receiver circuit for evaluation of the receiver signal is marked 8 while the other receiver circuit is marked 9. The transmitters for laser light are supplied by the firm Raytec AG, in Chur/Switzerland, Rossbodenstrasse, designated as laser directional measuring instrument. The design of support beams for coating devices can be seen, e.g., from U.S. Pat. No. 4,512,279.

What is claimed is:

1. A device for measuring the deflection of an elongate structural component supported on both ends and having a longitudinal axis, said device comprising:

at least one transmitting unit having means for transmitting a pair of signals each in the form of a sharply focused energy signal of electromagnetic radiation, said transmitting unit being connected firmly with the elongate structural component at approximately the center thereof such that the signals extend in opposite directions essentially parallel to the longitudinal axis of the elongate structural component and toward the respective ends of the elongate structural component;

two receiving units each arranged on a respective end of said elongate structural component and axially aligned with one another and with said transmitting unit, each receiving unit receiving a transmitted signal only from one direction relative to the ends of the elongate structural component, each said receiving unit comprising sensor means having a plurality of sensors arranged in at least one row including a zero sensor, with the row extending in the direction of deflection of the elongate structural component, said sensor means producing an output signal in response to impinging radiation thereon;

said transmitting and receiving units being arranged such that at a condition of zero deflection of the elongate structural component, each of the transmitted signals will be received by the zero sensor of the respective receiving unit, and that at a condition of non-zero deflection of the elongate structural component, at least one of the transmitted signals will be received by a sensor at a distance from the respective zero sensor, whereby the strength of the output signal from the respective said receiving unit corresponds to the distance said receiving sensor of said receiving unit is from the respective zero sensor indicating the degree of deflection of the structural component.

2. Device according to claim 1, in which said electromagnetic radiation is laser light.

3. Device according to claim 1, including two transmitting units arranged back to back at approximately the center of said elongate component, each transmitting unit interacting with only one of said receiving units.

4. Device according to claim 1, in which each receiving unit includes several juxtaposed rows of sensors arranged as a faceted eye.

5. Device according to claim 3, in which each receiving unit includes several juxtaposed rows of sensors arranged as a faceted eye.

6. Device according to claim 5, in which the deflection of the component is determined in two directions that are perpendicular to each other.

7. Device according to claim 1, and further including a summing device that forms the sum of the deflection signals of each receiving unit in a given direction of deflection.

8. Device according to claim 6, and further including a summing device that forms the sum of the deflection signals of each receiving unit in a given direction of deflection.

9. Device according to claim 1, and further including an averaging device that forms one-half the sum of the deflection signals of each receiving unit in a given direction of deflection.

10. Device according to claim 6, and further including an averaging device that forms one-half the sum of the deflection signals of each receiving unit in a given direction of deflection.

11. Device according to claim 8, and further including an averaging device that forms one-half the sum of the deflection signals of each receiving unit in a given direction of deflection.

12. Device for measuring the deflection of an elongate component with a longitudinal axis, supported on both ends, comprising:

a transmitting unit which at least in an axially parallel plane, in approximately the center of the component, is firmly connected with the outside of said elongate component, which transmitting unit emits sharply focused electromagnetic radiation;

a receiving unit responsive to electromagnetic radiation which is arranged in axial alignment with said transmitting unit outside on the ends of the elongate component, said receiving unit having a sensor surface sensitive to the radiation and including at least one row of sensor elements which are distributed in the manner of a faceted eye, with the row extending in the direction of the deflection.

13. Device according to claim 12, in which said electromagnetic radiation is laser light.

* * * * *